United States Patent
Loewen

(10) Patent No.: US 10,110,048 B2
(45) Date of Patent: Oct. 23, 2018

(54) INDUCTIVE MOBILE DEVICE CHARGER

(71) Applicant: Joanne Loewen, Lutz, FL (US)

(72) Inventor: Joanne Loewen, Lutz, FL (US)

(73) Assignee: BIBICORD, INC., Lutz, FL (US)

( * ) Notice: Subject to any disclaimer, the term of this patent is extended or adjusted under 35 U.S.C. 154(b) by 217 days.

(21) Appl. No.: 15/249,209

(22) Filed: Aug. 26, 2016

(65) Prior Publication Data

US 2017/0063142 A1    Mar. 2, 2017

Related U.S. Application Data

(60) Provisional application No. 62/211,130, filed on Aug. 28, 2015.

(51) Int. Cl.
*H02J 7/00* (2006.01)
*H02J 7/02* (2016.01)
*H02J 50/80* (2016.01)
*H02J 7/04* (2006.01)

(52) U.S. Cl.
CPC .............. *H02J 7/025* (2013.01); *H02J 50/80* (2016.02); *H02J 7/0021* (2013.01); *H02J 7/045* (2013.01)

(58) Field of Classification Search
USPC ........................................................ 320/108
See application file for complete search history.

(56) References Cited

U.S. PATENT DOCUMENTS

| | | | |
|---|---|---|---|
| D471,516 S * | 3/2003 | Tsay | D14/435.1 |
| 6,803,525 B1 | 10/2004 | Liao | |
| 2005/0269987 A1 | 12/2005 | Lin | |
| 2006/0083032 A1 | 4/2006 | McDonald et al. | |
| 2011/0159935 A1 | 6/2011 | Gavara | |
| 2014/0266025 A1* | 9/2014 | Jakubowski | H02J 5/005 320/108 |
| 2015/0015180 A1* | 1/2015 | Miller | H02J 7/0047 320/103 |
| 2015/0042269 A1* | 2/2015 | Koren | H02J 7/025 320/108 |

FOREIGN PATENT DOCUMENTS

| | | |
|---|---|---|
| GB | 2507712 A | 5/2014 |
| JP | 3193395 U | 10/2014 |
| RU | 61947 U1 | 3/2007 |

* cited by examiner

*Primary Examiner* — Robert Grant
(74) *Attorney, Agent, or Firm* — Gary L. Eastman, Esq.; Eastman & McCartney LLP

(57) ABSTRACT

Wireless Mobile Device Charging Mat Charm with clip and battery and with or without retractable cord to re-charge the charging mat is disclosed. This invention eliminates the problem of leaving phone charging mats behind when traveling or on the go. This invention eliminates the problem of not being able to charge a phone when electricity is not available.

18 Claims, 4 Drawing Sheets

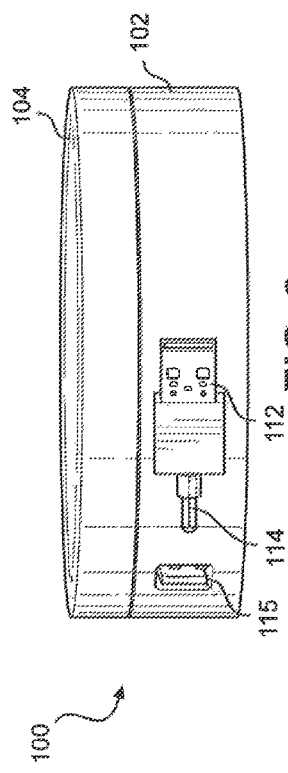
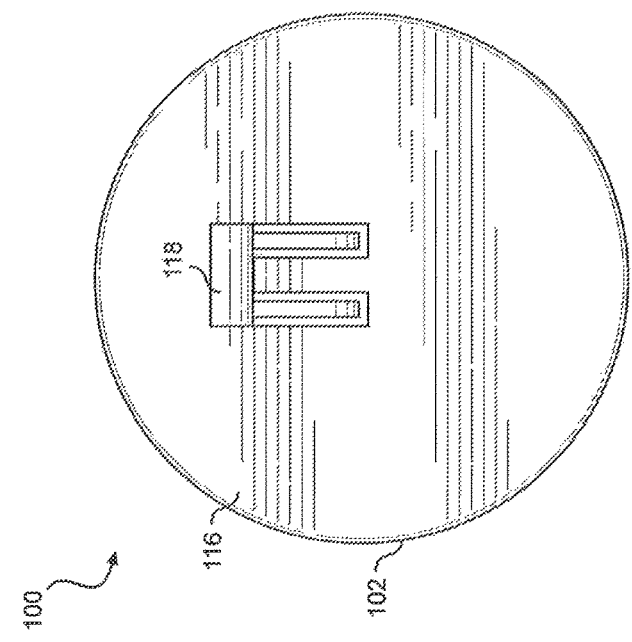
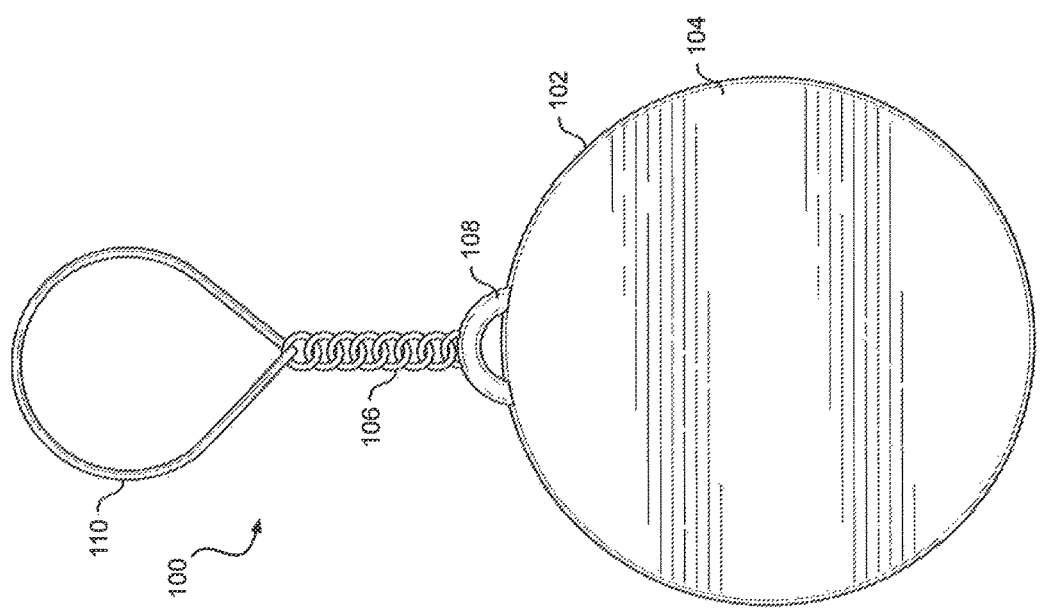

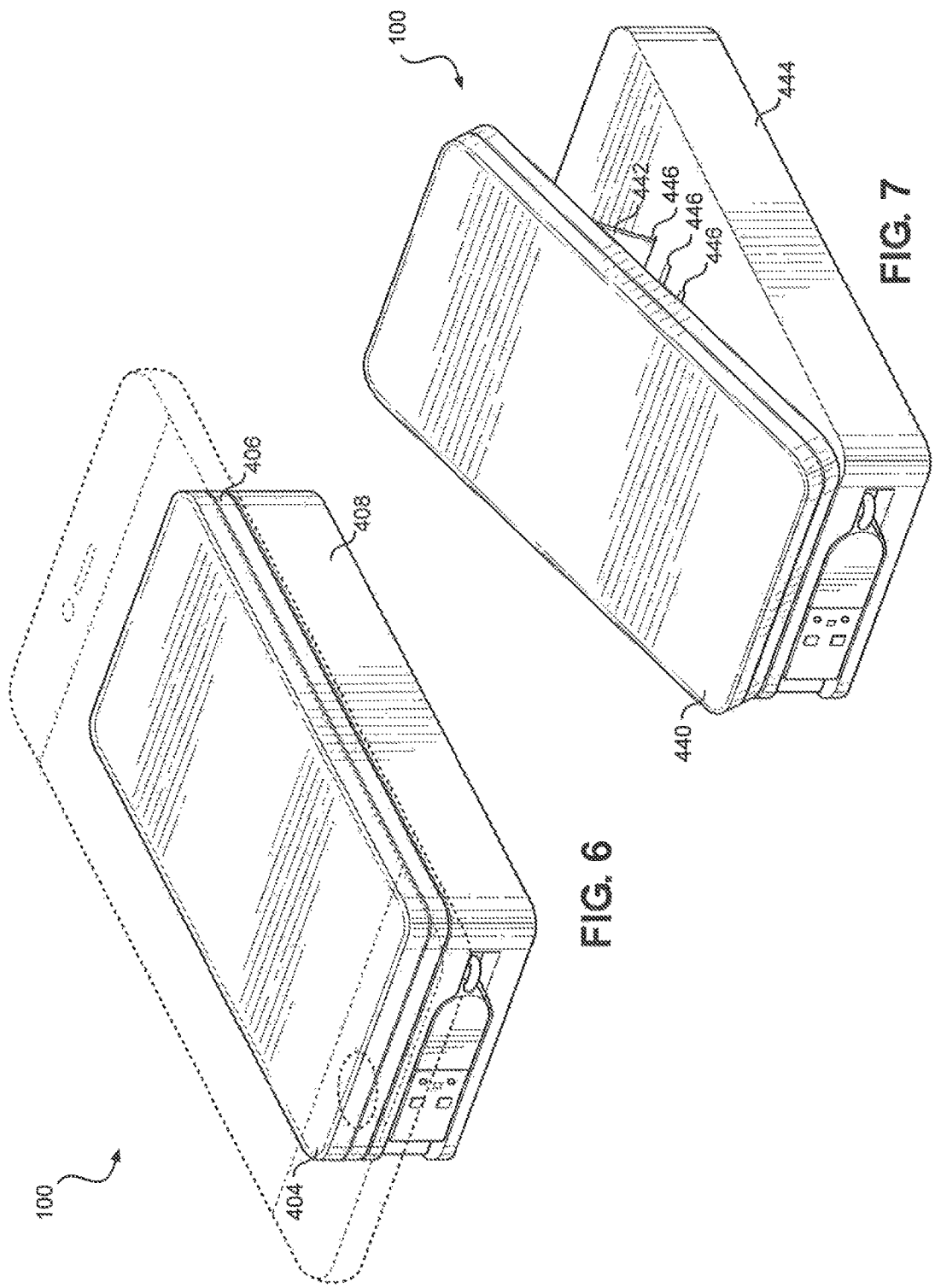

INDUCTIVE MOBILE DEVICE CHARGER

RELATED APPLICATIONS

This application claims the benefit of priority to the U.S. Provisional Patent Application for "Wireless Mobile Device Charging Mat Charm with clip and battery and with or without retractable cord to re-charge the charging mat," Ser. No. 62/211,130 filed on Aug. 28, 2015.

FIELD OF THE INVENTION

The present invention pertains generally to chargers for mobile electronic devices. More particularly, the present invention pertains to a mobile device charger using inductive coupling with a mechanism for convenient storage of the cable and increased portability of the charger, and attachment of the charger to a purse or backpack. The present invention is particularly, but not exclusively, useful as a personal electronic device charger for persons temporarily in places away from home.

BACKGROUND OF THE INVENTION

Electricity is not always available to use to charge phones and mobile devices. Mobile device charger cords and metal tips are exposed to damage because they are not protected. In addition, people leave mobile device chargers at home and in hotel rooms, resulting in loss of the charger and depletion of the battery within the device.

Existing Wireless Charging Mats are not Bag Charms and cannot be attached to other objects such as purses, pant loops, computer bags, necklaces. Therefore, they are easy to leave behind and hard to carry. Existing electric mobile device chargers do not have batteries built into them. They are disorganized, easily forgotten and easily broken.

The present invention allows the user to charge their mobile device either from the battery or using an external power source while it is still attached to their bag so that they do not forget it in the outlet.

This invention eliminates the problem of leaving phone charging mats behind when traveling or on the go. This invention eliminates the problem of not being able to charge a phone when electricity is not available.

Mobile device chargers provide a means for charging the batteries of personal electronic devices by connecting them to a power source. The power source to which a mobile device charger connects is generally either a standard power outlet in a building or a vehicle's power source through a cigarette lighter outlet or dedicated charging port.

Mobile device chargers currently offered for sale are easily damaged. The cords and connectors are not protected by the charger itself, and so they often sustain damage through exposure to people, pets, or other objects. Additionally, currently available mobile device chargers are often accidentally left at home or away from home in places where the owner was using them, such as offices or hotel rooms. Thus, special care must be taken to avoid damage or loss of currently available mobile device chargers.

In light of the above, it would be advantageous to provide a device for inductive charging of portable electronic devices that is durable, easy to use, and comparatively cost effective.

SUMMARY OF THE INVENTION

One object of the present invention is convenient portability and storage of a mobile device charger. Another object of the present invention is the avoidance of damage to a mobile device charger or loss of the charger.

As stated above, electricity is not always available to use to charge phones and mobile devices. In addition, users of phones often leave their phone charger behind when traveling or on the go. The invention claimed here solves this problem. The present invention allows the user to carry a wireless mobile device charging mat attached to a purse, backpack or computer back so that it is not left behind when travelling or on the go.

The claimed invention differs from what currently exists. We are not aware of any wireless mobile device charging mat enclosed in a bag charm that exists today. Existing wireless charging mats are not bag charms and cannot be attached to other objects such as purses, pant loops, computer bags, necklaces.

This invention eliminates the problem of leaving phone charging mats behind when traveling or on the go. This invention eliminates the problem of not being able to charge a phone when electricity is not available.

Existing mobile device chargers do not have a clip on them to allow them to be attached to anything else, so they are easily forgotten. Existing mobile device charger cords and metal tips are often damaged because they are exposed.

The present invention includes a wireless charging mat to charge mobile devices and display advertisements, logos, etc., a housing under the mat to hold a battery and a built in electrical plug, a charm clip to attach the mat to other objects such as purses or belt loops, a battery to charge a mobile device when an electrical outlet is not available, and an electrical plug built into the housing.

The present invention consists of a protective enclosure containing an inductive coupling charging circuit. A mobile device sitting on top of the present invention is charged through inductive coupling. An alternative embodiment includes a retractable cable with a connector at the end. The connector plugs into a power source such as a USB port in order to pass current from the power source to the inductive coupling charging circuit to charge the internal battery. When the invention is not in use, the enclosure protects the retracted cable and its connector, thus avoiding damage to the cable or connector. In an alternative embodiment, the cable and connector also provide current from the inductive mobile device charger to a mobile device, providing the additional ability of charging a mobile device that doesn't support inductive charging.

An alternative embodiment includes a retractable cable with a connecter at the end, such as a USB connector, a "Lightning" connector, or another type of charging connector, in conjunction with a mobile device charging circuit. The connector and corresponding charging circuit allows for charging a mobile device lacking support for inductive charging.

The enclosure on the present invention includes a connector for a chain. In one embodiment, this is a recessed part of the enclosure in which one side of the enclosure connects to the opposite side over the recess via a bridge or rod extending across the recess. A chain may be attached to the bridge or rod, In an alternative embodiment, the enclosure is extended on one end and the connector consists of an opening in the extension through which a chain may be connected. A clip or keychain may thus be attached to the enclosure through a cord or chain. By attaching the invention to another object via the clip, loss of the mobile device charger can be avoided, A preferred embodiment of the present invention uses a transformer to charge an internal battery, with a flyback controller on the primary side of the transformer and a synchronous rectifier circuit on the secondary side. The flyback controller switches the rectified main current through the primary side of the transformer at approximately 80 kHz. The switching speed is dithered to lessen harmonic content and ease EMI compliance. The resulting current is monitored by the flyback controller on an auxiliary winding on the primary side of the transformer, allowing the controller to protect against over-voltage and over-current conditions and the current to be monitored entirely on the primary side of the transformer. The secondary side of the transformer contains a synchronous rectifier circuit in place of the traditional diode, greatly improving the efficiency during use by removing the voltage/power loss across the diode. Further, when the load is removed entirely, a monitor circuit issues a special set of pulses through the transformer indicating to the primary-side flyback controller that there is no load, causing it to enter a low-power standby mode. This feature results in virtually zero standby power when the adapter is not connected to a device.

A preferred embodiment of the present invention includes a foldable plug that sits flush with the enclosure when folded in, but may be extended in order to connect to a power source. In one variation of said embodiment, a recess around the folded plug allows easy access to the plug in order to extend it. In another variation, the ends of the plug's prongs, when folded in, sit against the edge of the enclosure, allowing extension by grasping the end of said prongs and pulling outward via a motion of the hand against the edge of the enclosure. By folding in the plug so that it sits flush with the enclosure, the mobile device charger may be easily transported in a pocket or a purse without damaging other objects stored with it.

Also, a preferred embodiment of the present invention uses a cylindrical enclosure with rounded or beveled edges which allow it to easily be carried in a pocket or a purse without damaging other objects stored with it.

A battery is included inside the enclosure in an embodiment of the present invention, thus allowing the mobile device charger to provide current to a mobile device when no outside power source is available. Some embodiments may further include a receiving coil and related charging circuit to charge the internal battery via inductive charging from another mobile device charger, thus allowing the mobile device chargers of the present invention to charge each other. In this way, various mobile device chargers of the present invention can be stacked on top of each other and their internal batteries charged through inductive charging via a single original power source. The original power source may be a single household power outlet, which would suffice to simultaneously charge multiple mobile device chargers of the present invention.

A stand in an embodiment of the present invention is formed by a lever attached to the bottom of the wireless charging mat which sits flush in a first configuration and pivots outward and locks into various angles in other configurations. By locking the lever at an angle from the rest of the charging mat, the charging mat may be seated on a desk or table at an angle from the horizontal, allowing convenient use of the mobile device while the device is being charged.

A preferred embodiment of the present invention is made up of stackable modules. One module is the charging mat itself and includes the inductive charging circuitry. Another module provides the battery and a third module provides the power cord. The user can stack all three modules on top of each other, or use only the modules needed. For example, if the user is on the road and will not be able to use a power outlet, the power cord module may be left behind for the sake of convenience and portability. At home, the battery module may not be wanted. A stand may be formed with a lever attached to a base module or the bottom of any module. The lever sits flush with the base or module in a first configuration and pivot outward and lock into place at various angles in alternate configurations. Finally, battery charging circuitry allows the battery module to charge its internal battery when the invention is placed on another inductive mobile device charger.

A preferred embodiment of the present invention has a diameter of roughly 4 inches, or about 10 centimeters, which would be appropriate for charging most inductive-charging ready mobile phones. A rectangular embodiment would have a length of roughly 4 inches for the same reasons. Other embodiments have larger diameters or lengths for greater convenience in charging tablet computers. Embodiments of the present invention include other sizes as appropriate for charging various types of electronic devices, such as watches, jewelry, and step counters.

The Components are related as follows: The wireless charging mat is used to charge phones. The charm housing is attached to the mat and is used to hold the battery and the folding electrical plug. The charm clip is attached to the wireless charging mat and the housing to other objects. The battery is used to charge mobile devices. The folding electrical plug is used to charge the battery and provide power to the wireless charging mat charm.

The Invention Works as follows: The wireless charging mat charm is used to charge phones. The charm housing is attached to the mat charm and is used to hold the battery and the folding electrical plug. The charm clip is used to attach the wireless charging mat charm and the charm housing to other objects. The battery is used to charge mobile devices. The folding electrical plug is used to charge the battery and provide power to the wireless charging mat charm.

In order to make the invention, a person would make a wireless mobile charging mat and attach it to the housing. Then, insert a battery inside the housing and add a folding electrical plug. Then, a person would add a chain, rope, elastic or another type of cord and a clip. The battery, the wireless charging mat charm, the housing and a power source are all necessary. A USB port could be added to charge the battery. A retractable charging cord could be added to coil into the housing. A car charging plug could be added to charge the battery. If a USB port or a car charging plug was added, the folding electrical plug could be removed.

To use the invention, a person would attach the wireless mobile device charging mat charm to their purse, bag or backpack, belt loop or necklace, etc. and carry it with them so that they do not leave it behind when traveling or on the go. The person would charge their mobile device using the invention when they do not have access to electricity. A person would re-charge the mat charm when it runs out of power.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 1 is a top view of an inductive mobile device charger with a chain for convenient attachment of the charger to another object;

FIG. 2 is a side view of an alternative embodiment of the present invention showing a retractable USB cable;

FIG. 3 is bottom view of an inductive mobile device charger;

FIG. 6 is a perspective view of an embodiment of the present invention showing various modules comprising the elements of a mobile device charger which are stacked on top of each other; and FIG. 7 is a side view of an embodiment of the present invention showing a lever which allows the mobile device charger to sit at an angle for convenient use of a mobile device during charging.

DETAILED DESCRIPTION

Figure 4:
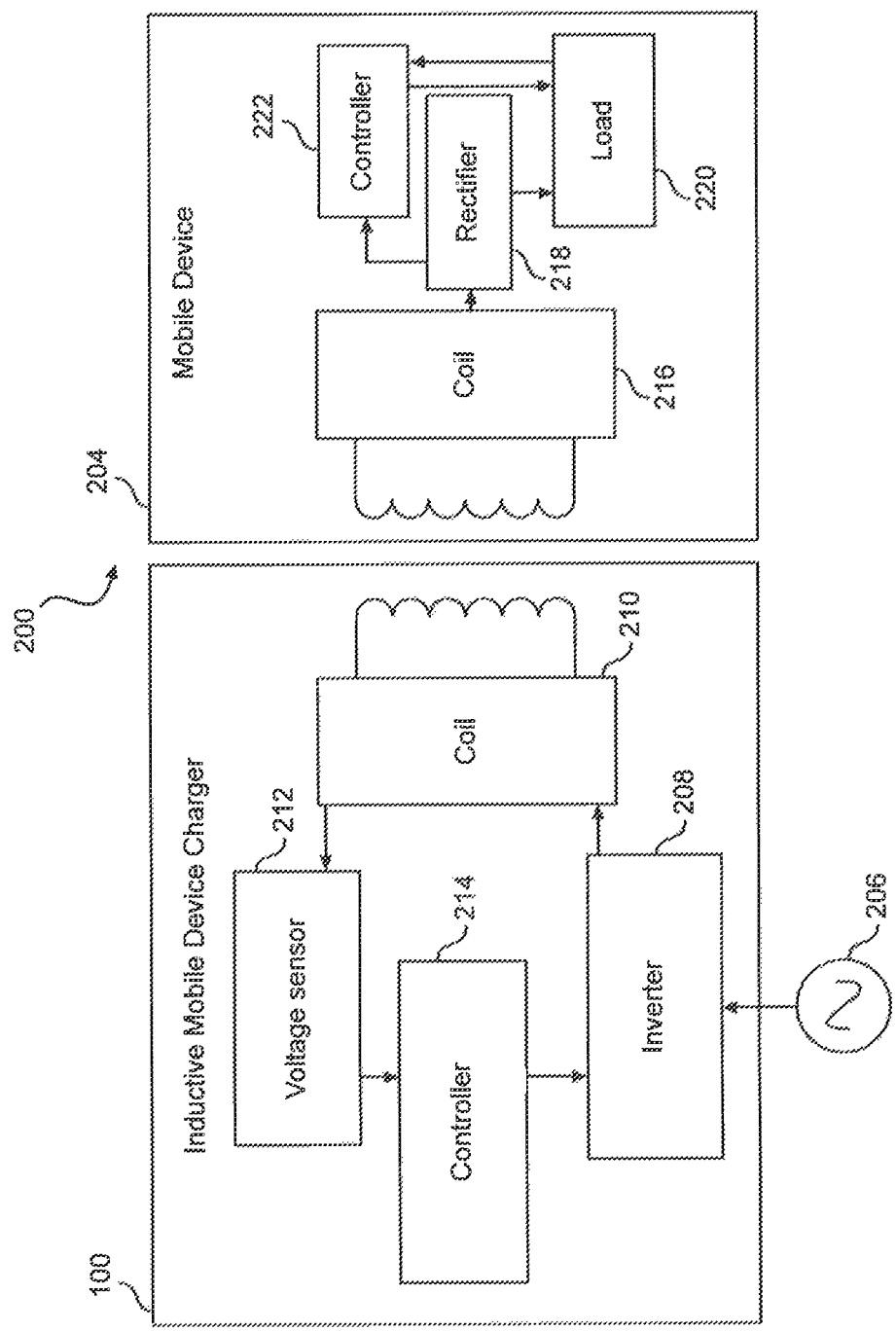
FIG. 4 is a diagram showing the major components of the inductive charging system of a preferred embodiment of the present invention.

FIG. 1 illustrates a top view of a preferred embodiment of an inductive mobile device charger 100 comprising an inductive charging circuit inside a housing 102. Housing 102 has a front face 104 on which a logo or advertisement may be displayed. A chain 106 is attached at one end to the housing 102 by a connector 108. A loop 110 is attached to the other end of chain 106, allowing the inductive mobile device charger 100 to be attached to a purse or other object. Loop 110 may be replaced by a clip, keychain, or other attachment in various embodiments of the present invention. The inductive mobile device charger 100 charges a mobile device sitting on its front face 104 through inductive coupling.

FIG. 2 illustrates a side view of an alternative embodiment of a inductive mobile device charger 100 which includes a charging connector 112 attached to the inductive mobile device charger 100 via a retractable cable 114. The charging connector 112 and retractable cable 114 allow charging the internal battery of the inductive mobile device charger 100 via an alternative power source. In a preferred embodiment, the charging connector 112 is a USB connector, allowing the mobile device charger 100 to use power from a USB port to charge the internal battery. A USB charging port 115 allows a user to connect and charge a personal electronic device that does not support inductive charging from either the internal battery of the mobile device charger 100 or its external power source.

FIG. 3 illustrates back view of an inductive mobile device charger 100, showing back face 116 on which sits an electrical plug 118. The electrical plug 118 provides power to the inductive mobile device charger 100 in order to charge a mobile device. Alternatively, electrical power is provided to the inductive mobile device charger 100 through electrical plug 118 in order to charge an internal battery. The inductive mobile device charger 100 then uses internal battery power to charge a mobile device, allowing charging to take place when an electrical socket is unavailable.

FIG. 4 illustrates the primary components and functionality of an inductive mobile device charging system 200 comprising an inductive mobile device charger 100 and a mobile device 204. A power source 206, such as an internal battery or rectified current from a power outlet, provides power to an inverter 208. The inverter 208 provides an AC waveform to a primary coil 210. In a preferred embodiment, the frequency of the waveform is between 100 and 200 kHz. In a preferred embodiment, the inverter 208 transfers power to the primary coil 210 by a full-bridge switching arrangement at a 50% duty cycle and a 130 kHz switching frequency. It is to be understood, however, that different frequencies may be used according to the needs of any individual project. A voltage sensor 212 monitors the primary coil 210 and provides data to a controller circuit 214. The controller circuit 214 in turn adjusts the output of the inverter 208 in order to provide an amount of power appropriate to the load provided by the mobile device 204. The voltage sensor 212 and the controller circuit 214 may also detect communications from the mobile device 204 and respond by increasing, decreasing, or shutting off the provided power.

The alternating current through the primary coil 210 creates a magnetic flux, which in turn creates an alternating current in a secondary coil 216 inside the mobile device. The current is rectified by a rectifying circuit 218 and passed on to the load 220. A controller circuit 222 in communication with both the rectifying circuit 218 and the load 220 causes signals to be sent to the inductive mobile device charger 100 requesting the amount of power needed by the load 220. In most instances, the load 220 will comprise a battery, and the power necessary will vary depending on the amount of charge already present in the battery. The controller circuit 222 of the mobile device 204 may communicate with the controller circuit 214 of the inductive mobile device charger 100 through backscatter modulation by brief alterations of the load placed on the secondary coil 216, which in turn are detected by the voltage sensor 212 in the inductive mobile device charger 100. Additionally, in some embodiments, communication across the primary coil 210 and secondary coil 216 may be accomplished through frequency-shift keying.

In a preferred embodiment of the invention, power source 206 comprises a battery as well as its own secondary coil, rectifier, and controller, which act as load 220, secondary coil 216, rectifying circuit 218, and controller circuit 214, respectively. Such a configuration allows multiple mobile device chargers 100 to be stacked onto each other, thus allowing for the simultaneous charging of the internal batteries of each mobile device charger 100. Such a configuration is particularly useful when multiple mobile device chargers 100 need to be charged, but only a single power outlet is available.

Figure 5:
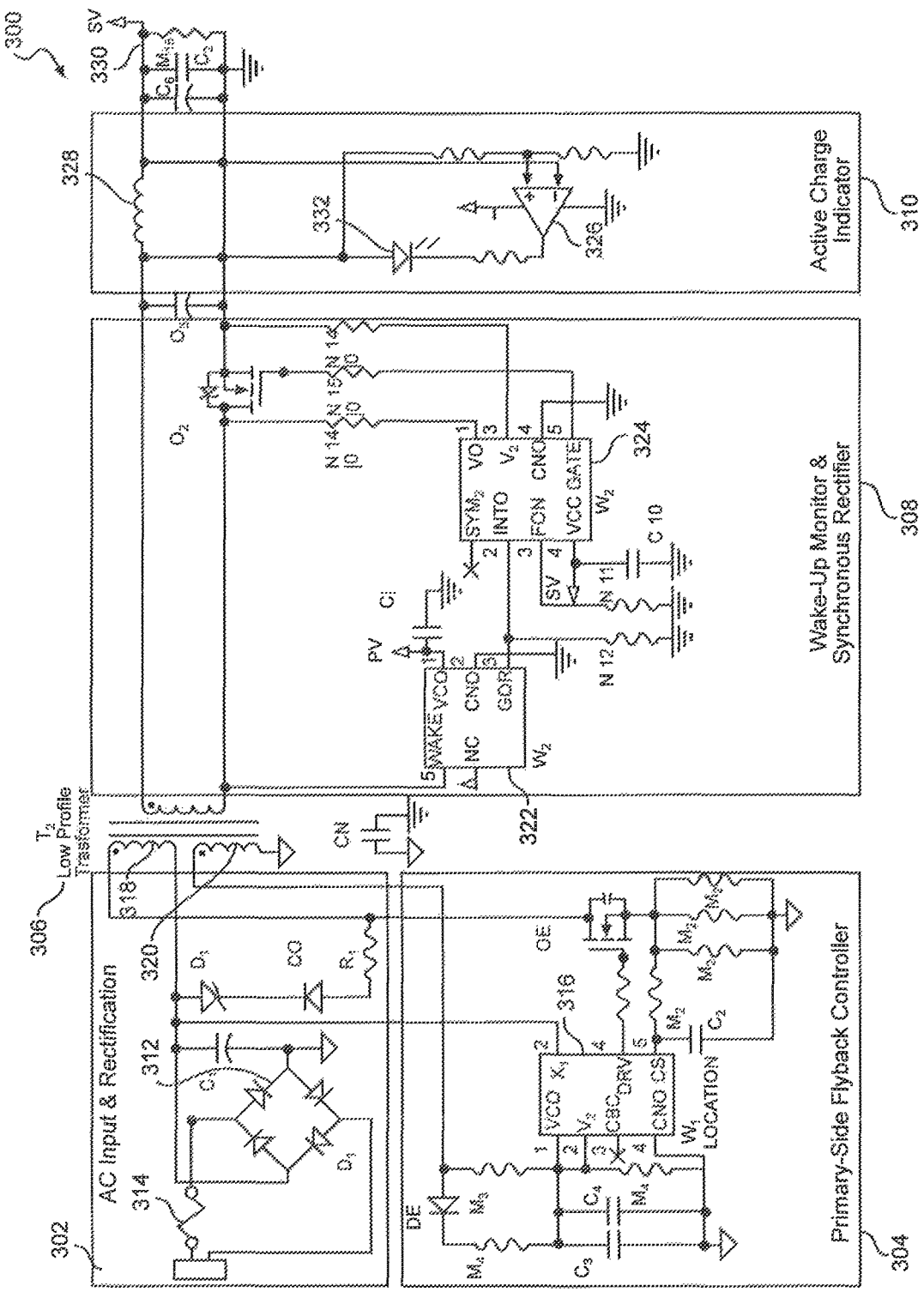
FIG. 5 is a schematic diagram showing the layout of electrical components in an AC/DC converter circuit used in charging the internal battery in a preferred embodiment of the present invention.

FIG. 5 is a schematic of an AC/DC converter circuit 300 as used in charging the internal battery in a preferred embodiment of the invention. The AC input is passed through initial rectifier 302 to a primary side flyback controller 304. A low-profile transformer 306 then steps down the voltage. A wake-up monitor and synchronous rectifier 308 on the secondary side of the transformer detects the presence or absence of a load, and signals the flyback controller 304 accordingly. The wake-up monitor and synchronous rectifier also acts as a near-ideal diode to rectify the current. An active charge indicator 310 detects when a personal electronic device is being charged and turns on light-emitting diode 332.

In the initial rectifier 302, a neutral AC line feeds one side of a diode bridge 312, while a hot AC line feeds the other side through a protective fuse 314. The rectified current is provided to the flyback controller 304, which is based on a UCC28730 integrated circuit 316. The flyback controller switches the current through primary winding 318 of transformer 306, and monitors the current through auxiliary winding 320 of the transformer. The winding ratios of transformer 306 may differ in different embodiments of the invention intended for sale in different regions of the world, as appropriate to the standard household outlet voltage of the region.

When there is no load, wake-up monitor and synchronous rectifier 308, based on a UCC24650 integrated circuit 322, sends a series of pulses through the transformer signaling the flyback controller 304 to shut down, saving power when there is no device connected to the charger. A UCC24610 integrated circuit 324 provides the synchronous rectifier function, acting as a near-ideal diode providing high efficiency and low voltage or power loss.

Finally, active charge indicator 310 uses a comparator 326 provide a voltage difference across light-emitting diode 332 when a voltage drop across filter inductor 328 indicates an active device is connected. Light-emitting diode 332 thus indicates when a connected personal electronic device is being charged.

After the AC input is transformed and rectified, the internal battery is charged with current provided through 5-volt output 330.

As shown in FIG. 6, an embodiment of the present invention may consist of separable modules, allowing the user to save space by attaching only the modules needed at any given time. This embodiment of mobile device charger 100 includes a wireless charging mat 404, in which is circuitry which receives DC power input and uses an inverter to transfer power to a primary coil, providing power via induction to a secondary or receiving coil in a mobile device. The mat 404 stacks on top of another module which provides the DC power input. Such a power source can be a battery module 406 which includes an internal battery, or a cord module 408. The cord module 408 acquires power from an external power source to provide to either a battery module 406 for charging its internal battery, or directly to the charging mat 404. The cord module 408 includes either a retractable USB cord configured to acquire power through a USB port, a retractable electrical plug configured to acquire power through a household power outlet, or both. Appropriate circuitry converts the power to the necessary DC output for the mat 404 or the battery module 406.

The mat 404 is shown stacked on top of the battery module 406, which in turn is stacked on the cord module 408, allowing the internal battery of the battery module 406 to be charged while power is provided to the mat 404 for charging a mobile device. If no power outlet is available, a user may stack the mat 404 on the battery module 406 alone and omit the cord module 408. If a power outlet is available and the user wishes to save space, the mat 404 may be stacked directly onto the cord module 408, omitting entirely the battery module 406.

FIG. 7 shows an embodiment of the present invention configured for positioning a mobile device charger 100 at an angle for convenient use of a mobile device during charging. A charging mat 440 comprises a power source 206, an inverter 208, a primary coil 210, a voltage sensor 212, and a controller circuit 214 as shown in FIG. 4. Attached to the bottom of the charging mat 440 is a lever 442 which, in a first configuration, sits flush with the charging mat 440. The lever 442 is attached to the charging mat 440 via a hinge, which allows the lever 442 to pivot outward into alternate configurations. The lever 442 is configured to lock into alternate configurations at desired angles. One way in which this may be accomplished is via a base 444 attached to one end of the charging mat 440 via a hinge. The base 444 would normally sit in a first configuration flush with the charging mat 440, and covering the lever 442 sitting in its first configuration. When folded outward, the lever 442 would be held in each of its configurations via stoppers 446 on the base 444. Stoppers 446 are preferably grooves in the base 444 or ridges on the base 444 which allow the lever 442 to be held in place.

While the above is a description of various embodiments of the present invention, further modifications may be employed without departing from the spirit and scope of the present invention. Thus the scope of the invention should not be limited according to these factors, but according to the following claims.

What is claimed is:

1. An inductive mobile device charger, comprising:
   an enclosure having a top end and a bottom end;
   an electrical plug on said bottom end;
   an inductive charging circuit having a coil configured to provide power to a mobile device through a pulsating magnetic field;
   an internal battery configured to provide power to said inductive charging circuit; and
   an internal inductive charging circuit configured to charge said internal battery when said inductive mobile device charger is placed on another inductive mobile device charger.

2. The inductive mobile device charger of claim 1, further comprising:
   a chain connector; and
   a chain having a first end and a second end, said first end attached to said chain connector.

3. The inductive mobile device charger of claim 2, further comprising an object attached to said second end of said chain, said object selected from the group consisting of:
   a keychain;
   a clip;
   a cord having a loop;
   a hook and loop fastener.

4. The inductive mobile device charger of claim 2, further comprising a retractable cable, a charging connector attached to said retractable cable, and a direct current charging circuit configured to charge said internal battery through said charging connector.

5. The inductive mobile device charger or claim 4, wherein said charging connector comprises a USB connector.

6. The inductive mobile device charger of claim 1, wherein said inductive charging circuit is further configured receive communications from a mobile device via backscatter modulation.

7. The inductive mobile device charger of claim 1, wherein said inductive charging circuit is further configured to communicate with a mobile device via frequency shift keying.

8. The inductive mobile device charger of claim 1 further comprising a stand, said stand comprising a lever which sits flush against said enclosure in a first configuration and pivots outward locking at an angle in a second configuration.

9. An inductive mobile device charger, comprising:
   an enclosure having a top end and a bottom end;
   an electrical plug on said bottom end of said enclosure;
   an inductive charging circuit;
   a chain connector; and
   a chain, having a first end attached to said chain connector, and a second end,
   wherein said inductive charging circuit comprises:
   a power source;

a coil;

an inverter configured to provide power in the form of an alternating current waveform to said coil;

a voltage sensor; and a controller configured to respond to a signal detected by said voltage sensor by causing said inverter to change the amount of power provided to said coil.

10. The inductive mobile device charger of claim 9 wherein said power source is an internal battery and said inductive mobile device charger further comprises a rectifier configured to receive power from said electrical plug, rectify the power received from said electrical plug, and charge said internal battery.

11. The inductive mobile device charger of claim 10, further comprising a retractable cable, a charging connector attached to said retractable cable, and a direct current charging circuit configured to charge said internal battery through said charging connector.

12. The inductive mobile device charger of claim 11, wherein said charging connector comprises a USB connector.

13. The inductive mobile device charger of claim 9, further comprising an object attached to said second end of said chain, said object selected from the group consisting of:
   a keychain;
   a clip;
   a cord having a loop;
   a hook and loop fastener.

14. The inductive mobile device charger of claim 9, further comprising a stand, said stand comprising a lever which sits flush against said enclosure in a first configuration and pivots outward locking at an angle in a second configuration.

15. The inductive mobile device charger of claim 9, wherein said inductive charging circuit is further configured receive communications from a mobile device via backscatter modulation.

16. The inductive mobile device charger of claim 9, wherein said inductive charging circuit is further configured to communicate with a mobile device via frequency shift keying.

17. An inductive mobile device charger comprising:
   a charging mat module comprising an inductive charging circuit comprising a coil configured to provide power to a mobile device through a pulsating magnetic field;
   a battery module attachable to said charging mat module, said battery module comprising a battery configured to provide power to said inductive charging circuit;
   an internal inductive charging circuit configured to charge said battery of said battery module when said inductive mobile device charger is placed on another inductive mobile device charger; and
   a cord module comprising a cord configured to connect to an external power source and a power converter circuit, wherein:
      said cord module is attachable to said battery module and said power converter circuit is configured to convert power from said external power source in order to charge said battery of said battery module, and
      said cord module is attachable to said charging mat module and said power converter circuit is configured to convert power from said external power source in order to provide power to said inductive charging circuit.

18. The inductive mobile device charger of claim 17 further comprising a base module attachable to the bottom of said mobile device charger and comprising a stand, said stand comprising a lever which sits flush against said base module in a first configuration and pivots outward locking at an angle in a second configuration.

* * * * *

UNITED STATES PATENT AND TRADEMARK OFFICE
CERTIFICATE OF CORRECTION

PATENT NO. : 10,110,048 B2  
APPLICATION NO. : 15/249209  
DATED : October 23, 2018  
INVENTOR(S) : Joanne Loewen Page 1 of 1

It is certified that error appears in the above-identified patent and that said Letters Patent is hereby corrected as shown below:

In the Claims

Column 8, Line 44: change "or claim 4" to --of claim 4--.

Signed and Sealed this  
Fourth Day of December, 2018

Andrei Iancu  
*Director of the United States Patent and Trademark Office*